Nov. 16, 1954
R. B. YOUNG ET AL
2,694,503
DIAPHRAGM SAFETY DEVICE
Filed Nov. 19, 1948
2 Sheets-Sheet 1
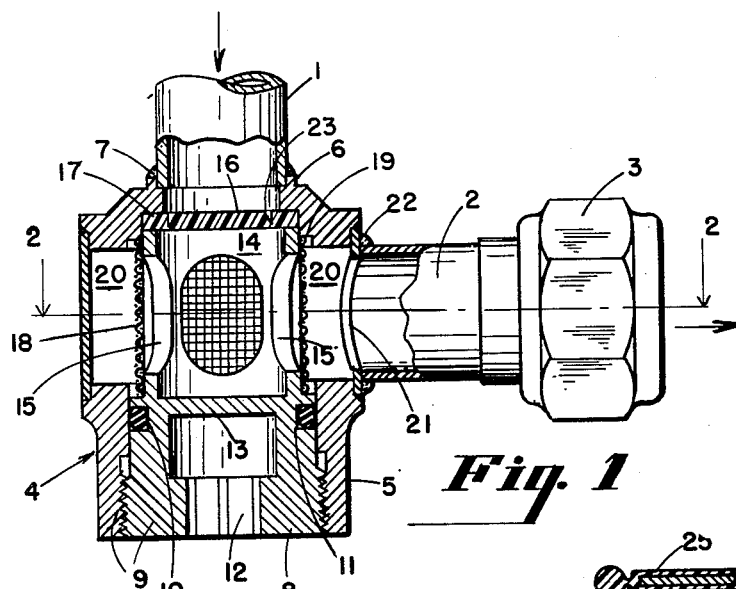
Fig. 1
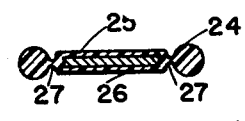
Fig. 3
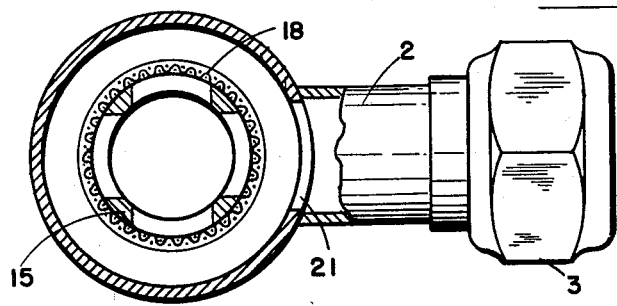
Fig. 2
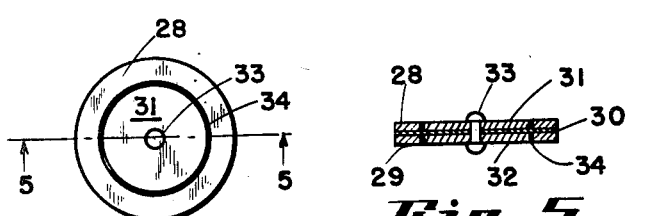
Fig. 4
Fig. 5
INVENTOR.
ROBERT B. YOUNG
CARSON E. HAWK
BY
D. Gordon Angus
ATTORNEY Nov. 16, 1954

R. B. YOUNG ET AL 2,694,503

DIAPHRAGM SAFETY DEVICE

Filed Nov. 19, 1948

INVENTOR.
ROBERT B. YOUNG
CARSON E. HAWK

BY

D. Gordon Angus

ATTORNEY

United States Patent Office 2,694,503
Patented Nov. 16, 1954

2,694,503

DIAPHRAGM SAFETY DEVICE

Robert B. Young, San Gabriel, and Carson E. Hawk, Pomona, Calif., assignors, by mesne assignments, to Aerojet-General Corporation, Cincinnati, Ohio, a corporation of Ohio Application November 19, 1948, Serial No. 60,952

2 Claims. (Cl. 220—89)

This invention relates to flow-control devices, and more particularly to the control of flow of fluid under pressure through a conduit.

The principal object of this invention is to provide a control device for use in a fluid flow line which will prevent the flow of fluid until the pressure reaches a desired threshold value.

There are instances in the operation of fluid flow conduits where it is desired to prevent the flow of fluid through the conduit until the pressure applied to the fluid builds up to a proper value. A particular instance of this is in the supplying of fuel and/or oxidizer fluids to a combustion chamber in which the fluid is burned or decomposed to form gases. A typical example of this is in the operation of a rocket motor by liquid propellants. Since the rocket motor develops a considerable chamber pressure as soon as any decomposition or combustion starts in the chamber, it is necessary that the incoming fluid propellants be placed under a pressure sufficiently high to overcome the chamber pressure and continue to flow positively through the injectors during the entire operation. One way of insuring a steady and uninterrupted flow after the motor has started is to provide means whereby no propellant fluid can flow into the chamber until the pressure on the fluid or fluids is greater than the maximum chamber pressure.

In accordance with our invention, we provide a simple means for preventing any flow of propellant into the chamber until the propellant fluids are pressurized to insure their positive introduction at all times. Our invention comprises a fitting adapted to be inserted in the conduit, comprising a frangible diaphragm which blocks the flow of fluid through the conduit until the pressure behind the fluid is sufficiently high to rupture the diaphragm. The presence of the material of the ruptured diaphragm is normally undesirable, as it may tend to block up the conduit or the outlet nozzle from it. To prevent this danger, we provide a strainer arranged so that the ruptured parts of the diaphragm are caught by the strainer and not passed on through the conduit.

According to a feature of our invention, we set the diaphragm in relation to the strainer so that the parts thereof are held in the strainer, while allowing free flow of the fluid through the strainer after the diaphragm is ruptured.

A preferred feature of our invention resides in a construction and arrangement whereby the strainer may be removed and cleaned out from time to time.

Preferably the strainer is cylindrical in shape and the diaphragm placed at the upstream end of it.

The foregoing and other features of our invention will be better understood from the following detailed description and the accompanying drawings, of which:

Fig. 1 illustrates a view partially in cross-section of a device in accordance with our invention;

Fig. 2 is a cross-section view taken at line 2—2 of Fig. 1;

Fig. 3 shows one form of diaphragm constructed as an O-ring suitable for use in Fig. 1;

Fig. 4 is a plan view of a metal foil diaphragm using reinforcing discs;

Fig. 5 is a cross section view of the diaphragm taken on the line 5—5 of Fig. 4.

Figure 6:
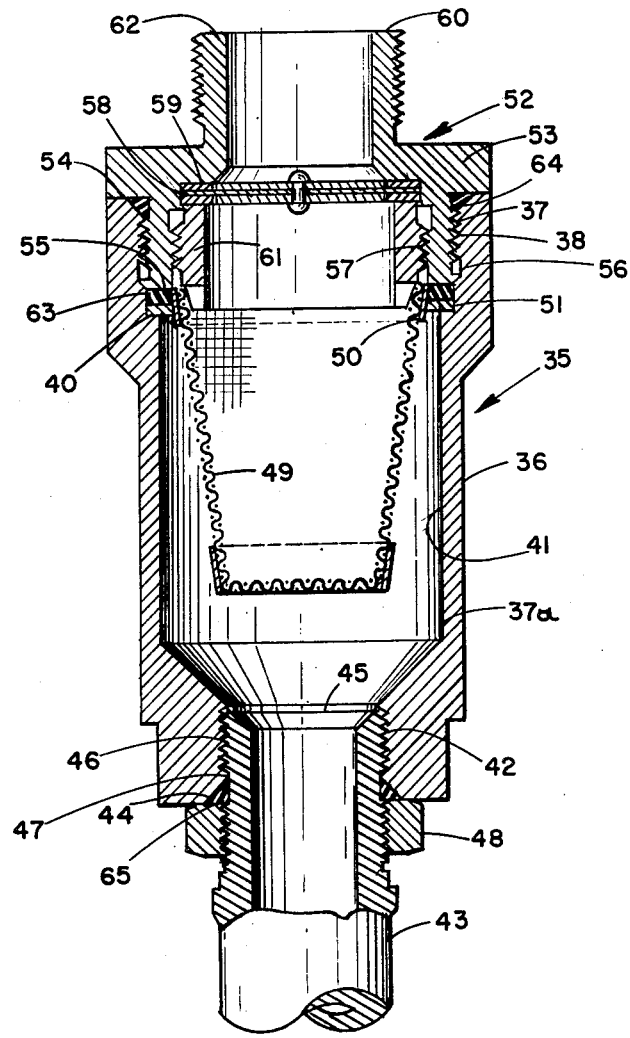
Fig. 6 shows a cross-section view of a modification of the device shown in Fig. 1.

Referring to Figs. 1 and 2, there is shown a fluid flow conduit 1 through which fluid is made to flow under pressure in the direction of the arrow; and a conduit section 2 carries the fluid from section 1 to a receiving device (not shown), to which it is adapted to be coupled by a coupling 3. Section 2 is at a right angle to section 1, and between the two sections there is placed a control device 4 in accordance with our invention. The control device comprises a cylindrical housing 5 having a collar 6 adapted to receive the end of conduit 1 to which it may be fastened by suitable means such as welding 7. Within the lower end of cylindrical housing 5, there is inserted a plug 8 which is threaded into the housing by threads 9; and to prevent leakage of fluid, the plug is provided with an outer annular groove 10 containing a flexible O-ring 11. For the purpose of threading the plug into the housing, the plug is provided with a suitable bore 12 to receive a wrench.

The plug is formed with a circular base 13, and has built upward from this base an upstanding cylindrical portion 14. The cylinder is open at its upper end, and in its side walls there are formed a number of openings or windows 15.

Over the open upper end of the cylinder there is placed a circular diaphragm 16 of a frangible material designed to rupture at the desired fluid pressure for the line. This diaphragm is fastened between the upper end of the cylinder and a shoulder 17 of the housing.

There is placed around the cylindrical portion 14 a cylindrical strainer, the upper end of the strainer being set in a groove 19 of the housing. Between the outer cylindrical wall of the housing and the cylindrical strainer 18, there is formed an annular space 20 into which fluid from conduit 1 flows through the strainer when the diaphragm 16 is ruptured, and this fluid flows out of space 20 through an opening 21 in the housing leading into conduit 2 which is shown welded to the housing at 22.

The diaphragm 16 is of a suitable material which ruptures at the desired pressure; and is shown as a plastic material of which it can conveniently be made. A suitable plastic composition is polytetrafluorethylene. This plastic may be machined in any desired manner and is obtainable on the market under the trade-name "Teflon." It is formed with a V groove 23 which may conveniently be circular extending concentrically around the center of the diaphragm, the point of the V extending part way through the diaphragm. The depth of the groove will determine the pressure at which the diaphragm ruptures.

Fig. 3 shows a modified form of diaphragm which may be substituted for the all plastic diaphragm 16 shown in Fig. 1. Diaphragm of Fig. 3 comprises a plastic O-ring 24 with a continuous membrane 25 extending across the central portion of the O-ring. In order to prevent the membrane 25 from merely ballooning out whenever pressure is applied against it, a metal disc 26 is moulded into the membrane 25. This metal disc may be of aluminum or any other suitable metal. The plastic membrane adjoining the outer edge of the metal disc 26 is preferably made relatively thin, forming a circular concentric groove 27 on each side of the diaphragm. This insures easy breakage of the membrane whenever sufficient pressure is applied against the surface 25 which, in turn, transmits pressure to metal disc 26, thereby shearing all of the membrane from the central portion of the O-ring 24.

One type of plastic material that has been particularly suitable for the O-ring type of diaphragm, as shown in Fig. 3, is vinylite; however, any other plastic that is capable of being molded into an O-ring and has suitable corrosion resistant properties may be substituted for vinylite.

Figures 4 and 5 illustrate a preferred form of diaphragm which may be employed in place of diaphragm 16 of Fig. 1. This diaphragm comprises two annular washers 28 and 29 between which there is inserted a sheet of metal foil 30, such as a piece of aluminum foil. This metal foil is thin enough to break whenever the pressure in the line becomes sufficiently high to permit the satisfactory operation of the jet motor. A pair of metal discs 31 and 32 having a diameter slightly smaller than the inner diameter of the annular washers 28 and 29 and of approximately the same thickness as the washers are riveted to each side of the metal foil 30 by rivet 33.

When the pressure becomes sufficiently high the foil will rupture along the narrow, circular, unsupported portion 34 of the foil, thereby opening the conduit to the full line flow. The discs prevent the formation of tears in the foil which while opening it to a portion of the line flow would interfere with full capacity flow.

A modification of the device shown in Fig. 1 is shown in Fig. 6. In this device the side outlet control member 4 of Fig. 1 is replaced with a straight through flow member 35. Member 35 comprises a body portion 36, provided with a large axial bore 37, which starts at the upper end and continues for a short distance. Bore 37 is provided with threads 38, which extend approximately to the end of bore 37. Slightly beyond the end of threads 38 the diameter of the bore reduces sharply forming a shoulder 40. A central bore 41, concentric with bore 37, but smaller in diameter, continues at this reduced diameter for a substantial distance 37a into body portion 36. From point 37a the diameter of the bore again reduces sharply in diameter forming an outlet bore 42. Bore 42 is provided with threads to receive a conduit fitting 43. The lower end of outlet bore 42 is countersunk forming a bevelled exit 44.

Conduit fitting 43 is provided with threads 46 which extend a substantial distance from the end 45 of the fitting. These threads are cutaway for a short distance at a position corresponding to the bevelled outlet portion 44 of body member 36 when the fitting is in position, forming an annular groove 47 which has approximately the same depth as the root of threads of fitting 43. A lock nut 48 is screwed onto the threads 46.

A filtering screen 49, preferably frusto conical in shape, is provided with an upper ring 50 which is attached to annular washer 51 by welding, brazing, etc. The outer diameter of washer 51 is made approximately the same as the largest diameter of the shoulder 40.

An entry cap member 52, which threads into the body portion 36 holds the filtering screen 49 into position and also supports the bursting diaphragm. For convenience the diaphragm Fig. 5 is employed although any of the other diaphragms could be used.

Entry cap member 52 comprises a disc-like portion 53 which is as large in diameter as the upper end of body member 36. The disc-like portion of the entry member 53 continues at this diameter for a short distance and then reduces in diameter to conform with the diameter of bore 37 forming a shoulder 54. The member continues at this diameter to the lower end 55 of the cap member and is provided with threads corresponding to the threads 38 which are provided in body portion 36. The lower end 55 of the entry member 52 is provided with an axial bore 56 which continues to a depth corresponding to the position of shoulder 54. Bore 56 is provided with threads 57.

Beyond the point corresponding to the position of shoulder 53 the bore continues at reduced diameter 58. This diameter corresponds to approximately the diameter of the bursting diaphragm which in the illustration would be the diameter of the washers 28 and 29 of the bursting diaphragm, and continues at this diameter to a depth approximating the thickness of the particular diaphragm used. Beyond this depth the diameter of the bore is again reduced forming a shoulder 59 against which the diaphragm rests. The bore then continues at this reduced diameter through the upper end 60 of the entry cap member.

An annular lock nut 61 capable of threading on inner threads 57 is then screwed in place. When the lock nut 61 is in position it rests tightly against the diaphragm.

A threaded extension projects above the surface portion 53 and permits coupling of the entry member to a conduit. When the unit is assembled the filtering screen 49 rests on shoulder 40. An O ring 63, or similar packing is placed against washer 51 and upper ring 50 and is compressed when entry member assembly 52 is screwed into place on threads 38. A suitable annular packing 64 may also be inserted between the upper end of body member 36 and entry member 52 to prevent leakage and a second annular packing 65 may be inserted in the bevelled exit portion 44 and compressed by nut 48, thereby preventing any leakage between the conduit 43 and the body member 36 of the device.

The straight through design has the advantage that the fluid passing through it is subjected to a lower pressure drop when passing from the upstream side to the downstream side of the member. This is considerably less than the cases where the unit was provided with a side outlet.

A further advantage is that the integral diaphragm assembly may be removed as a unit and leak-tested on a test stand before installation, thereby saving considerable time. Since the assembly is easily removable a new diaphragm may be quickly replaced without disturbing the remainder of the assembly. The flow control device does not require any permanent attachments such as brazing or welding as in the embodiment shown in Fig. 1 and can be more easily installed.

The strength and thickness of the diaphragm are established by the pressure on the fluid at the upstream part of the conduit. The diaphragm will rupture at the desired pressure and the ruptured portions will be caught in the strainer to prevent them from flowing downstream with the fluid. Whenever it is desired to clean out the strainer, this may be done by removal of plug 8 which will carry the strainer out with it.

The invention should not be construed as limited to the details of the particular embodiments shown and described, which are given by way of illustration rather than limitation, and the invention should not be limited except in accordance with the appended claims.

We claim:
1. A frangible diaphragm adapted for use in a flow-control device of the type having a strainer in a fluid flow line, the diaphragm being adapted to act as a closure at the upstream side of the strainer, said diaphragm comprising a supporting ring having a central membrane extending across the region within the periphery of the ring, and a rigid disc somewhat smaller in diameter than the membrane and embedded within the membrane, leaving an annular section of the membrane between the disc and the supporting ring which is adapted to rupture when fluid pressure is applied to it.

2. A diaphragm according to claim 1 in which the thickness of the annular section of the membrane is thinner than the thickness of the membrane embedding said metal disc and also thinner than the thickness of the supporting ring.

References Cited in the file of this patent

UNITED STATES PATENTS

| Number | Name | Date |
|---|---|---|
| 929,974 | McNutt | Aug. 3, 1909 |
| 1,579,141 | Pierce | Mar. 30, 1926 |
| 1,697,199 | Martyn | Jan. 1, 1929 |
| 1,976,975 | Williams | Oct. 16, 1934 |
| 2,183,208 | Allen et al. | Dec. 12, 1939 |
| 2,230,961 | Lewis | Feb. 4, 1941 |
| 2,437,836 | Santiago | Mar. 16, 1948 |
| 2,553,267 | Nedoh | May 15, 1951 |
| 2,586,858 | Parsons | Feb. 26, 1952 |

FOREIGN PATENTS

| Number | Country | Date |
|---|---|---|
| 216,036 | Great Britain | May 22, 1924 |
| 10,791 | Australia | Jan. 18, 1934 |
| 513,426 | Great Britain | Oct. 12, 1939 |
| 578,008 | Great Britain | June 12, 1946 |